United States Patent [19]

Fukuyama et al.

[11] Patent Number: 5,244,686
[45] Date of Patent: Sep. 14, 1993

[54] PROCESS FOR PRODUCING CARBONATED JELLY PRODUCTS

[75] Inventors: Takayasu Fukuyama; Kazuo Horii; Kiyoshi Takanoyama, all of Saitama, Japan

[73] Assignee: Meiji Seika Kaisha Ltd., Tokyo, Japan

[21] Appl. No.: 824,565

[22] Filed: Jan. 23, 1992

[30] Foreign Application Priority Data

Jan. 24, 1991 [JP] Japan .................................... 3-22605

[51] Int. Cl.$^5$ ........................ A23L 1/0532; A23L 1/06
[52] U.S. Cl. ..................... 426/575; 426/477; 426/407
[58] Field of Search ............... 426/575, 577, 573, 564, 426/477, 407

[56] References Cited

U.S. PATENT DOCUMENTS

| | | | |
|---|---|---|---|
| 1,611,528 | 12/1926 | Jameson | 426/577 |
| 1,945,963 | 2/1934 | Baier et al. | 426/577 |
| 2,864,706 | 12/1958 | Stoloff | 426/575 |
| 3,445,243 | 5/1969 | Moirano | 426/575 |
| 3,554,771 | 1/1971 | Wiczer | 426/564 |
| 3,556,810 | 1/1971 | Moirano | 426/575 |
| 3,956,173 | 5/1976 | Towle | 426/575 |
| 3,962,482 | 6/1976 | Comer et al. | 426/575 |
| 4,276,320 | 6/1981 | Moirano | 426/564 |

OTHER PUBLICATIONS

Patent Abstracts of Japan, vol. 12, No. 333 (Sep. 8, 1988).
Patent Abstracts of Japan, vol. 11, No. 262 (Aug. 25, 1987).
Patent Abstracts of Japan, vol. 9, No. 138 (Jun. 13, 1985).

*Primary Examiner*—Jeanette Hunter
*Attorney, Agent, or Firm*—Sughrue, Mion, Zinn, Macpeak & Seas

[57] ABSTRACT

A process for producing a carbonated jelly product rich in coolness to the taste is disclosed, comprising adding carbon dioxide to a uniform dispersion of cold water-insoluble κ-carrageenan and/or ι-carrageenan in an aqueous solution, sealing the carbonated dispersion into a container, sterilizing the dispersion by heating, and cooling the dispersion to set.

1 Claim, No Drawings

PROCESS FOR PRODUCING CARBONATED JELLY PRODUCTS

FIELD OF THE INVENTION

This invention relates to a process for producing carbonated jelly products rich in coolness.

BACKGROUND OF THE INVENTION

Several jelly products recently placed in the market lack in coolness. Carbonated jelly products are expected to give a cool and refreshing taste.

Known processes for carbonation of jelly include the process disclosed in JP-A-50-69247 (the term "JP-A" as used herein means an "unexamined published Japanese patent application") which comprises putting a gelling food composition in a pressure-resistant container, setting the composition, adding carbon dioxide gas to the container, and shaking the content to homogenize while maintaining at a temperature above the point where the gel becomes sol, followed by cooling. However, this process is not deemed suitable for industrial production because of such complicated steps involved, i.e., heating of a gelling agent to dissolve, cooling for setting and, after addition of carbon dioxide gas, re-heating for solution, shaking, and re-cooling for setting.

JP-A-59-45837 proposes a process comprising mixing a gelatin solution and a carbon dioxide-containing aqueous solution at a low temperature and setting the mixture in a sealed container. However, the process has such disadvantages that carbon dioxide is easily dissipated during mixing, the process is difficult to carry out on an industrial scale, and the resulting gelatin jelly is inferior in texture to the jelly of $\kappa$-carrageenan, $\iota$-carrageenan or a mixture thereof.

SUMMARY OF THE INVENTION

An object of the present invention is to provide a process for producing a carbonated jelly product rich in coolness to the taste.

The inventors paid their attention to the fact that $\kappa$-carrageenan and $\iota$-carrageenan are insoluble in cold water and are dissolved at 70° to 80° C. and have found an industrially advantageous process for producing carbonated jelly products comprising uniformly dispersing these carrageenan species in a cold aqueous solution, carbonating the gelling agent dispersion, sealing the dispersion in a container, sterilizing the dispersion by heating while dissolving the carrageenan, and cooling the solution to set.

That is, the present invention provides a process for producing a carbonated jelly product comprising adding carbon dioxide to a uniform dispersion of cold water-insoluble $\kappa$-carrageenan and/or $\iota$-carrageenan in an aqueous solution, sealing the carbonated dispersion into a container, sterilizing the dispersion by heating, and cooling the dispersion to set.

DETAILED DESCRIPTION OF THE INVENTION

"Carrageenan" is a generic term given to $\kappa$-carrageenan, $\iota$-carrageenan, and $\lambda$-carrageenan. $\kappa$-Carrageenan comprises a 1,3-bonded galactose 4-sulfate residue and a 1,4-bonded 3,6-anhydro-D-galactose residue and is insoluble in cold water. $\iota$-Carrageenan comprises a 1,3-bonded galactose 4-sulfate residue and a 1,4-bonded 3,6-anhydro-D-galactose 2-sulfate residue and is also insoluble in cold water. On the other hand, $\lambda$-carrageenan comprises a 1,3-bonded galactose 2-sulfate residue and a 1,4-bonded D-galactose 2,6-sulfate residue and is soluble in cold water. Carrageenan species which can be used as a gelling agent in the present invention are those which are insoluble in cold water but, when heated, dissolve to give an aqueous solution having a gelling power which can gel on cooling, i.e., $\kappa$-carrageenan, $\iota$-carrageenan, and a mixture thereof.

In the present invention, $\kappa$-carrageenan and/or $\iota$-carrageenan used as a gelling agent is uniformly dispersed in an aqueous solution in concentrations of from 0.3 to 2.0%, preferably 0.3 to 1.0%, by weight. For improving texture, small amounts of other gelling agents such as xanthane gum (0.1% or less), locust bean gum (0.3% or less), pectin (0.3% or less, gelatin (1.0% or less) and agar (0.3% or less) may be added to the dispersion.

The aqueous solution which can be used in the present invention includes water, fruit juice, fruit wine, milk, fermented milk, coffee, cola, tea, etc. and mixtures thereof. If desired, the aqueous solution may contain sweeteners, souring agents, coloring matters, flavors, etc.

$\kappa$-Carrageenan and/or $\iota$-carrageenan must be uniformly dispersed in the aqueous solution, if desired, with stirring. The aqueous solution should be kept at 10 to 45° C. If its temperature exceeds 45° C., the carrageenan partly dissolves, leading to an increase in viscosity or setting at the time of carbonation or charging hereinafter described.

The resulting uniform dispersion is adjusted to a temperature of from 2° to 25° C. and then carbonated, for example, using a carbonator. Carbonation is carried out at such a pressure that the final product may contain from 0.5 to 3.0 gas volume of carbon dioxide. The terminology "carbon dioxide gas volume" as used herein is a unit used in the carbonated beverage industry derived from the fact that the solubility of carbon dioxide is close to 1° at 15.5° C. according to Ostwald's absorption coefficient. That is, the amount of carbon dioxide which is absorbed in a given amount of water at 15.5° C. under standard atmospheric pressure is taken as 1 gas volume.

The carbonated dispersion is sealed in a container for a carbonated beverage and then sterilized by heating.

The heat sterilization of the carbonated dispersion is conducted in a hot water bath or with a hot water shower-type pasteurizer at a contents temperature of 75° to 90° C. at which the carrageenan is completely dissolved. If the contents temperature is less than 75° C., the carrageenan is not completely dissolved. After the sterilization, the dispersion is cooled to 40° C. or less to set to obtain a desired carbonated jelly product.

The present invention is now illustrated in greater detail by way of Examples, but it should be understood that the present invention is not deemed to be limited thereto. All the percents are by weight unless otherwise indicated.

EXAMPLE 1

Influences of the difference in kind of gelling agent upon production of a carbonated jelly product were examined.

The gelling agent(s) shown in Table 1 below was/were uniformly dispersed in isomerized sugar, and water and other raw materials were mixed therewith to prepare a gelling agent dispersion. At this point, pectin of Formulation 4 underwent setting and, judging incapable of carbonation, no further processing was conducted.

Each of the dispersions, except Formulation 4, was cooled to 18° C. At this point, the gelatin dispersion of Formulation 5 underwent setting and could not be passed through a carbonator.

Each of the gelling agent dispersions, except Formulations 4 and 5, was passed through a carbonator at a pressure of 2.6 kg/cm$^2$G, and 100 g portions of the carbonated dispersion were charged in 110 ml-volume bottles for a carbonated beverage made of glass. After sealing the bottle, the contents were heat-sterilized in product of Formulation 6 wanted easy melting in the mouth and was crumbly, proving unpalatable as a jelly product. Formulation 7 did not gel on cooling. The product of Formulation 8 was not well-matched with the coolness of carbon dioxide, proving poor as a jelly product.

Separately, each product was stored at 37° C. for 2 weeks and subjected to the same organoleptic test. As a result, the products of Formulations 1 to 3 were similarly cool and tasty, whereas the product of Formulation 6 turned to sol assumably due to degradation of the agar.

TABLE 1

|  | Formulation 1 | Formulation 2 | Formulation 3 | Formulation 4 | Formulation 5 | Formulation 6 | Formulation 7 | Formulation 8 |
| --- | --- | --- | --- | --- | --- | --- | --- | --- |
| Isomerized sugar | 13.0 | 13.0 | 13.0 | 13.0 | 13.0 | 13.0 | 13.0 | 13.0 |
| 1/5 Conc. orange juice | 4.0 | 4.0 | 4.0 | 4.0 | 4.0 | 4.0 | 4.0 | 4.0 |
| ι-Carrageenan | 1.0 |  | 0.5 |  |  |  |  | 0.5 |
| κ-Carrageenan |  | 1.0 | 0.5 |  |  |  |  | 0.5 |
| λ-Carrageenan |  |  |  |  |  |  | 1.5 | 0.5 |
| Low methoxyl pectin |  |  |  | 0.6 |  |  |  |  |
| Gelatin |  |  |  |  | 5.0 |  |  |  |
| Agar (powder) |  |  |  |  |  | 1.0 |  |  |
| Calcium lactate |  |  |  | 0.05 |  |  |  |  |
| Flavor | 0.1 | 0.1 | 0.1 | 0.1 | 0.1 | 0.1 | 0.1 | 0.1 |
| Citric acid | 0.3 | 0.3 | 0.3 | 0.3 | 0.3 | 0.3 | 0.3 | 0.3 |
| Sodium citrate | 0.02 | 0.02 | 0.02 | 0.02 | 0.02 | 0.02 | 0.02 | 0.02 |
| Water | 81.58 | 81.58 | 81.58 | 81.93 | 77.58 | 81.58 | 81.08 | 81.08 |
| Total (wt %) | 100.00 | 100.00 | 100.00 | 100.00 | 100.00 | 100.00 | 100.00 | 100.00 |
| Results of Organoleptic Test: |  |  |  |  |  |  |  |  |
| Average point | 0 | 0 | 0.5 |  |  |  |  | 1.0 |
| Remarks | well-matched with coolness | well-matched with coolness | well-matched with coolness | gelled during mixing | gelled, incapable of carbonation | unpalatable, not preservable | not gelled | ill-matched with coolness | hot water at 85° C. for 20 minutes.

After cooling, the bottles were put in a refrigerator set at 5° C. for 24 hours and then subjected to organoleptic teset by twenty male and female panel members in twenties. The degree of palatability and coolness was rated according to the following standards of evaluation. The results obtained are shown in Table 1.

| Standard of Evaluation: | |
| --- | --- |
| 1) Texture: | |
| Too soft and unpalatable: | −2 |
| Somewhat soft and slightly palatable: | −1 |
| Moderately hard and palatable: | 0 |
| Somewhat hard and slightly palatable: | 1 |
| Too hard and unpalatable: | 2 |
| 2) Coolness: | |
| Not cool: | −2 |
| Slightly cool: | −1 |
| Moderately cool: | 0 |
| Somewhat irritative: | 1 |
| Irritative: | 2 |
| Significant Test: | |
| *: Significantly different at the 5% significance level | |
| N: Not significantly different | |

As a result, the products prepared from Formulations 1 to 3 were judged to be tasty jelly products rich in coolness due to carbon dioxide. On the other hand, the The difference between Formulations 1 and 8 was significant at the 5% significance level.

The difference between Formulations 2 and 8 was significant at the 5% significance level.

The difference between Formulations 3 and 8 was significant at the 5% significance level.

EXAMPLE 2

Influences of the difference in concentration of gelling agent upon production of a carbonated jelly product were examined.

The gelling agents shown in Table 2 below were uniformly dispersed in isomerized sugar, and water and other raw materials were mixed therewith to prepare a gelling agent dispersion.

Each of the dispersions was cooled to 10° C. and passed through a carbonator under a pressure of 1.5 kg/cm$^2$G, and 100 g portions of the carbonated dispersion were charged in 110 ml-volume bottles for a carbonated beverage made of glass. After sealing the bottle, the contents were heat-sterilized with a shower of hot water at 90° C. for 15 minutes.

After cooling, the product was conditioned at 8° C. and subjected to tasting. Formulations 2 to 4 gave carbonated jelly products as desired, whereas Formulation 1 remained unset, and Formulation 5 gave hard gel which was unpresentable as a jelly product.

TABLE 2

|  | Formulation 1 | Formulation 2 | Formulation 3 | Formulation 4 | Formulation 5 |
| --- | --- | --- | --- | --- | --- |
| Isomerized sugar | 10.00 | 10.00 | 10.00 | 10.00 | 10.00 |
| κ-Carrageenan | 0.10 | 0.15 | 0.30 | 1.00 | 1.50 |
| ι-Carrageenan | 0.10 | 0.15 | 0.30 | 1.00 | 1.50 |
| Xanthane gum | 0.01 | 0.01 | 0.01 | 0.01 | 0.01 |

TABLE 2 -continued

|  | Formulation 1 | Formulation 2 | Formulation 3 | Formulation 4 | Formulation 5 |
| --- | --- | --- | --- | --- | --- |
| Locust bean gum | 0.10 | 0.10 | 0.10 | 0.10 | 0.10 |
| 1/5 Conc. grape juice | 2.00 | 2.00 | 2.00 | 2.00 | 2.00 |
| Tartaric acid | 0.20 | 0.20 | 0.20 | 0.20 | 0.20 |
| Sodium citrate | 0.02 | 0.02 | 0.02 | 0.02 | 0.02 |
| Flavor | 0.10 | 0.10 | 0.10 | 0.10 | 0.10 |
| Water | 87.37 | 87.27 | 86.97 | 85.57 | 84.57 |
| Total (wt %) | 100.00 | 100.00 | 100.00 | 100.00 | 100.00 |
| Quality | unset at the time of tasting | meets the purpose though weakly set at the time of tasting | Satisfactorily set at the time of tasting with moderate coolness | presentable as jelly product though set hard | too hard and unpresentable as jelly product |

EXAMPLE 3

Influences of the difference in temperature at which gelling agents were dispersed upon production of a carbonated jelly product were examined.

| Formulation: | |
| --- | --- |
| Isomerized sugar | 12.0% |
| Granulated sugar | 2.0% |
| κ-Carrageenan | 0.5% |
| Xanthane gum | 0.05% |
| Locust bean gum | 0.1% |
| Water | 85.35% |
| Total: | 100.00% |

The above gelling agents were uniformly dispersed in isomerized sugar at a varied temperature as shown in Table 3 below, and the resulting gelling agent dispersion was further treated in the same manner as in Example 2 to obtain a carbonated jelly product.

As shown in Table 3, it was proved that a part of the gelling agent dissolved at a temperature exceeding 45° C. to increase the viscosity of the dispersion, which caused reductions in capacity of the liquid feed line, gas absorption during carbonation, and capacity of bottling. It was also proved that the gelling agent had deteriorated dispersibility in liquid sugar at temperatures lower than 10° C. and required much time for dispersing and liquid feeding, resulting in various disadvantages in industrial production.

TABLE 3

| Temperature of Dispersion | Evaluation of Dispersion State |
| --- | --- |
| 8° C. | The liquid had too a high viscosity to be dispersed and fed. |
| 10° C. | Dispersibility and miscibility were satisfactory, giving no problem in the subsequent steps. |
| 20° C. | Dispersibility and miscibility were satisfactory, giving no problem in the subsequent steps. |
| 30° C. | Dispersibility and miscibility were satisfactory, giving no problem in the subsequent steps. |
| 45° C. | Part of the gelling agent in the dispersion dissolved, causing problems in the subsequent steps. |
| 50° C. | The gelling agent began to dissolve in the dispersion to increase the viscosity, causing problems in the steps of carbonation and bottling. |

EXAMPLE 4

Influences of the difference in temperature of sterilization upon production of a carbonated jelly product were examined.

| Formulation: | |
| --- | --- |
| Isomerized sugar | 10.00% |
| Granulated sugar | 3.00% |
| κ-Carrageenan | 0.60% |
| Xanthane gum | 0.04% |
| Locust bean gum | 0.10% |
| 1/5 Conc. orange juice | 4.00% |
| Citric acid | 0.25% |
| Sodium citrate | 0.02% |
| Flavor | 0.20% |
| Water | 81.79% |
| Total: | 100.00% |

κ-Carrageenan and xanthane gum were uniformly dispersed in isomerized sugar. Separately, locust bean gum was dissolved in hot water at 85° C., followed by cooling to 30° C. The thus prepared two liquids were mixed together with other raw materials in a usual manner to prepare a gelling agent dispersion.

The dispersion was passed through a carbonator under a pressure of 1.3 kg/cm$^2$G at a dispersion temperature of 14° C. A 165 g aliquot of the carbonated dispersion was charged in a 180 ml-volume bottle for a carbonated beverage made of glass and sealed. The bottle was sterilized with a shower of hot water at 90° C. so that the contents were heated to the temperature shown in Table 4 below. After cooling, the temperature of the contents was adjusted to 10° C. and then tasted.

As a result, when sterilized at contents temperatures lower than 75° C., since the gelling agent did not completely dissolve for exhibiting sufficient gelling power, the gelling agent of the prescribed amount failed to produce a desired carbonated jelly product. On the other hand, at sterilization temperature exceeding 75° C., the gelling agent completely dissolved to provide a tasty jelly product having well-matched coolness.

TABLE 4

| Temperature of Contents under Sterilization | Dissolved State of Gelling Agent and State of Setting |
| --- | --- |
| 60° C. | The gelling agent did not completely dissolve, tending to be carried down. The gelling power was weak. |
| 70° C. | The gelling agent did not completely dissolve. The gelling power was weak. |
| 75° C. | The gelling agent completely dissolved to show a gelling power. |
| 80° C. | The gelling agent completely dissolved to show a gelling power. |

EXAMPLE 5

Influences of the difference in carbon dioxide gas volume for carbonation upon production of a carbonated jelly product were examined.

| Formulation: | |
| --- | --- |
| Isomerized sugar | 12.00% |
| Refined sugar | 3.00% |
| κ-Carrageenan | 0.45% |
| ι-Carrageenan | 0.05% |
| Xanthane gum | 0.04% |
| Locust bean gum | 0.05% |
| 1/5 Conc. orange juice | 4.00% |
| Citric acid | 0.25% |
| Sodium citrate | 0.02% |
| Flavor | 0.20% |
| Water | 79.94% |
| Total: | 100.00% |

κ-Carrageenan, ι-carrageenan, and xanthane gum were dispersed in isomerized sugar, if necessary with the aid of a mechanical treatment by means of a powder dissolving pump, etc. to prepare a uniform dispersion. Separately, locust bean gum was premixed with refined sugar and completely dissolved in hot water at 90° C. to prevent formation of undissolved lumps, followed by cooling to 30° C. or lower. Then, the thus prepared two liquids were mixed together with other raw materials to obtain a gelling agent dispersion.

The dispersion was passed through a carbonator at controlled pressure and temperature so as to have a carbon dioxide gas volume shown in Table 5 below. A 165 g aliquot of the carbonated dispersion was sealed in a glass-made 180 ml-volume bottle for a carbonated beverage.

The bottle was passed through a pasteurizer so that the contents were kept at 85° C. for a retention time of 15 minutes and then cooled to obtain a carbonated jelly product. After conditioning at 10° C., the jelly product was subjected to organoleptic test in the same manner as in Example 1. As a result, the product having a gas volume of 0.4 or less lacked in coolness of carbon dioxide. It was proved that coolness owing to carbon dioxide was exerted at a gas volume of 0.5 or higher, reaching the best at a gas volume between about 1.5 volume and about 2.0 volume. At a gas volume of 3.5 or higher, the product was stingy due to carbon dioxide, far apart from coolness

TABLE 5

| Gas Volume | Evaluation on Coolness | Average Point | Significance Test |
| --- | --- | --- | --- |
| 0.4 | No cool | −1.8 | * |
| 0.5 | Slightly cool | −0.5 | N |
| 1.0 | Cool | −0.1 | N |
| 1.5 | Cool | 0.2 | N |
| 3.0 | Cool | 0.8 | * |
| 3.5 | Stingy | 1.5 | |

According to the present invention, the following effects are produced.

1) Since all the steps of mixing of raw materials, carbonation, and bottling are carried out with a gelling agent being in a dispersed state, a carbonated jelly product can be produced on an industrial scale.

2) Since carbon dioxide gas is absorbed in a liquid having dispersed therein a gelling agent, uniform jelly in which carbon dioxide is uniformly distributed can be obtained.

3) The necessary equipment and steps involved are much simpler than those conventionally used. The process of the present invention is, as a matter of course, applicable to the conventional carbonated product production lines.

While the invention has been described in detail and with reference to specific examples thereof, it will be apparent to one skilled in the art that various changes and modifications can be made therein without departing from the spirit and scope thereof.

What is claimed is:

1. A process for producing a carbonated jelly product containing from about 0.5 to about 3.0 gas volume of carbon dioxide comprising adding carbon dioxide to a uniform dispersion, said uniform dispersion having a temperature of from about 10° C. to about 45° C., and being comprised of about 0.3 to about 2.0% by weight cold water-insoluble κ-carrageenan and/or ι-carrageenan in an aqueous solution, sealing the resulting carbonated dispersion in a container, sterilizing the resulting sealed dispersion by heating at about 75° C. or higher, and cooling the resulting sterilized carbonated dispersion to set.

* * * * *